United States Patent
Pisz

(10) Patent No.: US 9,918,001 B2
(45) Date of Patent: Mar. 13, 2018

(54) CROWD SOURCING EXTERIOR VEHICLE IMAGES OF TRAFFIC CONDITIONS

(71) Applicant: Toyota Motor Sales, U.S.A., Inc., Torrance, CA (US)

(72) Inventor: James T. Pisz, Huntington Beach, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 551 days.

(21) Appl. No.: 14/465,008

(22) Filed: Aug. 21, 2014

(65) Prior Publication Data
US 2016/0057335 A1  Feb. 25, 2016

(51) Int. Cl.
*H04N 5/232* (2006.01)
*H04N 5/247* (2006.01)
*G08G 1/0967* (2006.01)

(52) U.S. Cl.
CPC ..... *H04N 5/23206* (2013.01); *G08G 1/09675* (2013.01); *G08G 1/096716* (2013.01); *G08G 1/096775* (2013.01); *H04N 5/23222* (2013.01); *H04N 5/23229* (2013.01); *H04N 5/247* (2013.01)

(58) Field of Classification Search
CPC ......... G08G 1/096716; G08G 1/09675; G08G 1/096775; H04N 5/23206; H04N 5/23222; H04N 5/23229; H04N 5/247
USPC .................................. 348/149, 148
See application file for complete search history.

(56) References Cited

U.S. PATENT DOCUMENTS

| | | | |
|---|---|---|---|
| 6,850,269 B2 * | 2/2005 | Maguire | H04N 7/185 348/149 |
| 7,613,564 B2 | 11/2009 | Vorona | |
| 8,188,887 B2 | 5/2012 | Catten et al. | |
| 8,620,532 B2 | 12/2013 | Curtis et al. | |
| 8,718,910 B2 | 5/2014 | Gueziec | |
| 9,013,579 B2 * | 4/2015 | Ikeda | B60R 1/00 348/142 |
| 9,036,509 B1 * | 5/2015 | Addepalli | H04W 4/046 370/259 |

(Continued)

OTHER PUBLICATIONS

International Search Report and Written Opinion for PCT/US2015/046271, dated Nov. 4, 2015, 12 pages.

*Primary Examiner* — William C Vaughn, Jr.
*Assistant Examiner* — Naod Belai
(74) *Attorney, Agent, or Firm* — Christopher G. Darrow; Darrow Mustafa PC

(57) ABSTRACT

An apparatus and method for crowd sourcing current traffic conditions using an image sensor on a vehicle to record traffic conditions at the vehicle location, date and time stamp the images, and transmit the images along with selected vehicle operating conditions and vehicle coordinates through a network to a central crowd sourcing traffic condition control. The control stores the images and, upon receiving an image request from a vehicle, transmits traffic condition images to the requesting vehicle through the network for a specified roadway segment. A vehicle opted-in to the control can select another opted-in vehicle to have an image taken by the any selected vehicle of a desired road location. The control handles the exchange of a request and an image between the requesting vehicle and the selecting vehicle to enable an instantaneous image of a desired road location to be displayed in the requesting vehicle.

7 Claims, 4 Drawing Sheets

(56) References Cited

U.S. PATENT DOCUMENTS

| | | | |
|---|---|---|---|
| 2002/0173907 A1* | 11/2002 | Ando | G08G 1/20 |
| | | | 701/410 |
| 2003/0128275 A1* | 7/2003 | Maguire | H04N 7/185 |
| | | | 348/149 |
| 2004/0252192 A1 | 12/2004 | Adachi et al. | |
| 2009/0082950 A1 | 3/2009 | Vorona | |
| 2011/0095908 A1 | 4/2011 | Nadeem et al. | |
| 2012/0123667 A1 | 5/2012 | Gueziec | |
| 2012/0158275 A1 | 6/2012 | Huang et al. | |
| 2013/0016213 A1* | 1/2013 | Yova | H04N 7/14 |
| | | | 348/143 |
| 2013/0041941 A1 | 2/2013 | Tomasic et al. | |
| 2013/0150087 A1 | 6/2013 | Kosuru et al. | |
| 2013/0242098 A1 | 9/2013 | Hahne et al. | |
| 2014/0118551 A1* | 5/2014 | Ikeda | B60R 1/00 |
| | | | 348/148 |

\* cited by examiner

FIG. 1
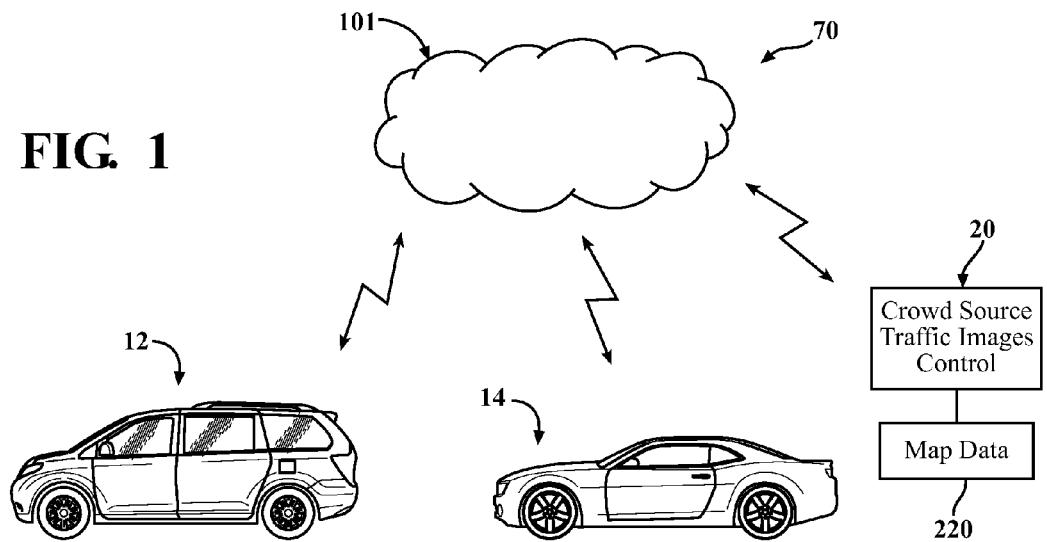
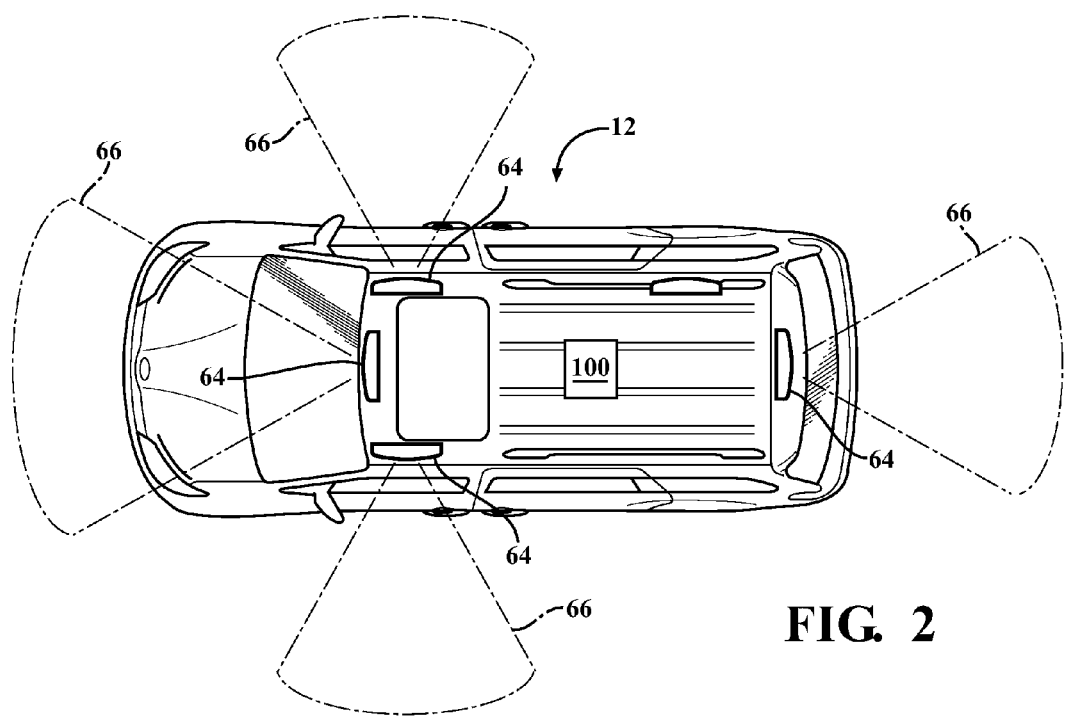
FIG. 2

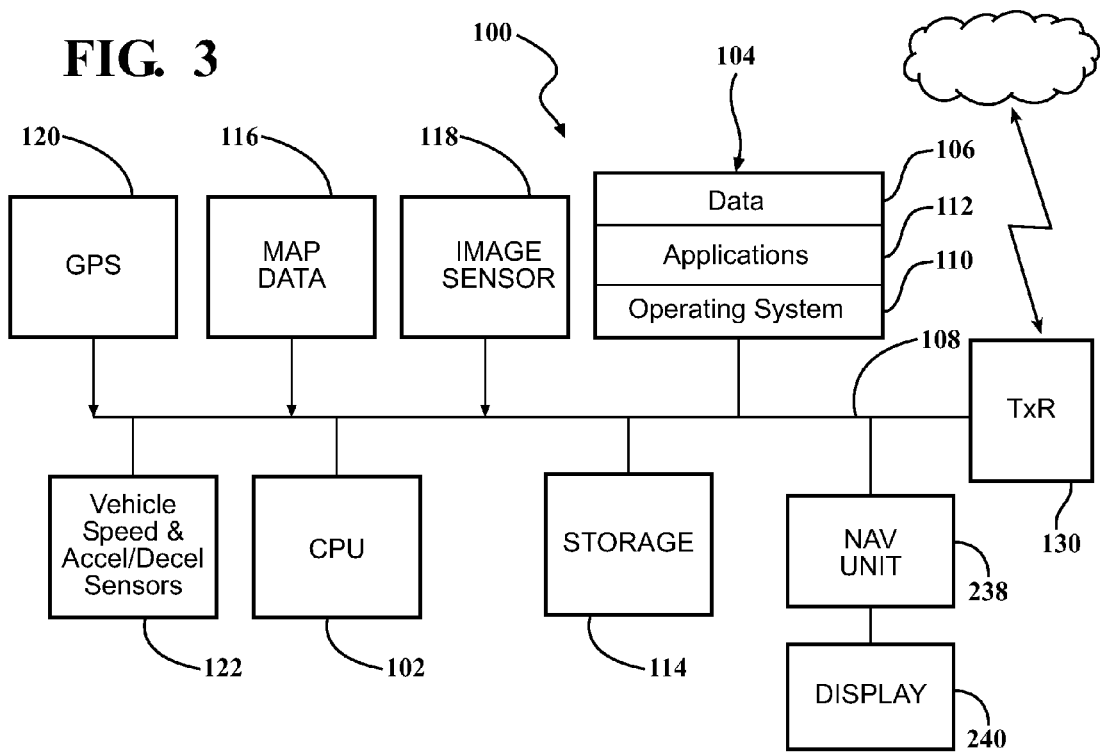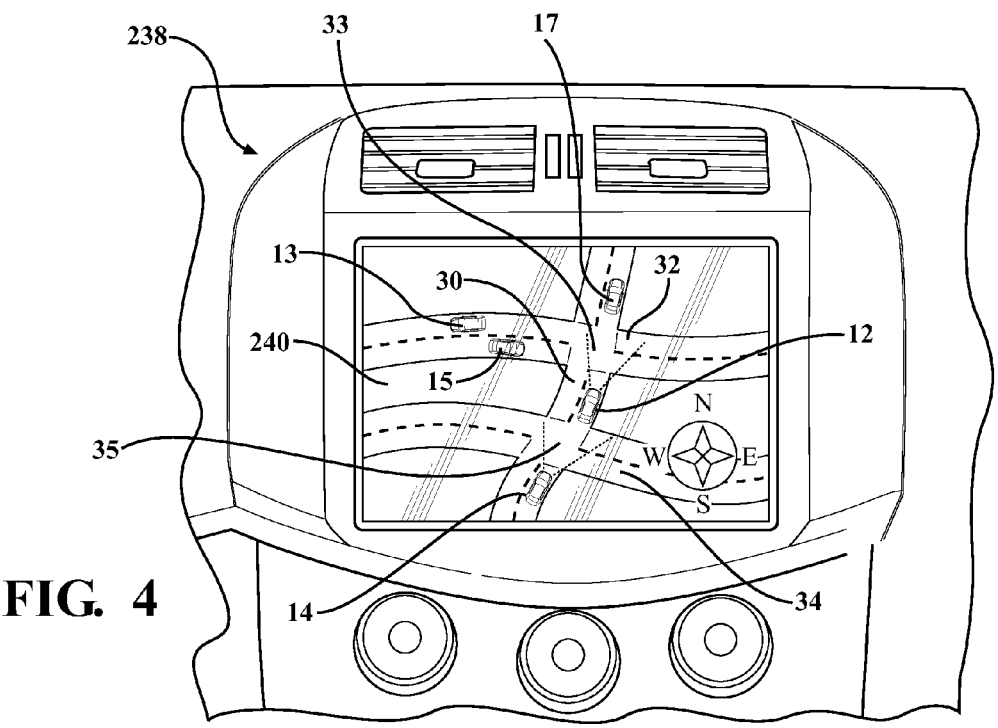

CROWD SOURCING EXTERIOR VEHICLE IMAGES OF TRAFFIC CONDITIONS

BACKGROUND

The present disclosure relates to methods and/or apparatuses for capturing and reporting road traffic conditions.

Road traffic conditions are reported by television and radio broadcasts to provide vehicle driver's awareness of current traffic conditions on the route on which the driver is operating a vehicle. The actual traffic condition information for such television and radio broadcast are acquired from cameras either stationally mounted at key intersections, buildings or bridges throughout a locale or from helicopters which traverse a given route over a locale. Reporters can also provide traffic condition audio and/or visual reports from their current location.

While such traffic condition reports are current as the nature of television and radio broadcast limits the broadcast of such traffic conditions to only selected times during a given hour of a 24 hour day, such as every 15, 30 or 60 minutes. It is common for more frequent traffic condition reports to be broadcast during morning and evening rush hours and fewer in the middle of the day and practically none during the night time.

Current vehicle navigation systems provide an image of a road on which a vehicle is traveling along with intersections, cross-roads, alternate routes, and major traffic influencing events, such as road construction.

Mobile applications such as Google Maps®, can provide a still photograph of a particular road segment, intersection, etc. However, such photographic information is completely independent of current road conditions as the visual images are old images stored in memory and very infrequently updated.

It would be desirable to obtain current traffic condition reports which can be downloaded and viewed or otherwise made available to a vehicle driver in advance of a particular road segment ahead of the current position of the vehicle.

SUMMARY

A method for generating visual images of roadway traffic conditions includes receiving, at a network, traffic condition image data from a computing device associated with a vehicle traversing a roadway, where the traffic condition data includes location heading and speed data of the vehicle, storing the received traffic condition and vehicle data along with a day and time stamp and, upon receiving an image request from a vehicle for a specific road segment, transmitting traffic condition images of the requested road segment through the network to the vehicle originating the request.

The method obtains the traffic condition data from at least one least image sensor mounted on the vehicle.

The method includes supplies vehicle location coordinate data and at least one of speed, acceleration, and deceleration data along with the images.

A wireless communication network is provided between a computing device on a vehicle and a crowd sourcing traffic condition control.

The method transmits the most recent time and day stamped image data to the requesting vehicle upon receipt of an image request for a particular road segment.

A method of reporting road traffic condition images to a vehicle includes providing a computing device coupled to an image sensor on a vehicle coupled to for recording traffic conditions on a roadway traversed by the vehicle. The computing device executes stored program instructions to time and date stamp the recorded images, couple vehicle operating condition data with the images, and transmit the images and the time and date stamp and vehicle operating condition data to a network. A crowd sourcing traffic condition control includes one or more processors executing stored program instructions to receive the images and vehicle operating data from the vehicle, and to store the images in conjunction with coordinates of the road segment where the images were taken, along with time and date stamp information and vehicle operating conditions. Upon request from a vehicle, the control transmits the stored traffic condition images through the network to the requesting vehicle.

The method transmits the most recent time and date stamped images of a particular road segment in response to an image request from a vehicle.

The method stores all of the images from the vehicle and, in response to a request for traffic condition images containing at least one of a specified road coordinate location, in conjunction with time, date and direction factors, transmits the traffic condition images taken for the specified date, time and direction to the vehicle from which the request originated.

The method provides computing devices in a plurality of vehicles capable of transmitting images from image sensors carried on each of the plurality of vehicles to the control. The computing devices, when storing the images from at least one of the image sensors on the vehicle, store at least a time and a date that the image was taken by an image sensor.

According to another aspect, storing the most recent traffic condition image can include tracking, by a crowd sourcing traffic condition control, the geographic location of each vehicle having network communication capabilities, transmitting and displaying images of all vehicles actively coupled to the network to all such vehicles, generating a road location image request by one of the vehicles, the image request including a selection of another vehicle actively coupled to the network in the proximity of the selected road location, receiving the request by the crowd sourcing traffic condition control of the vehicle selection, transmitting commands to the selected vehicle for generating an image, and receiving and transmitting by the crowd sourcing traffic condition control the taken image to the requesting vehicle for display in the requesting vehicle.

In the method, any of the vehicles can opt-in to the network. In the method, opting-in to the network can be automatic whenever a vehicle is operating or manually input in any vehicle.

The crowd sourcing traffic condition control transmits icons for display on each navigation screen of any vehicle opted-in to the network of all vehicles which are opted-in to the network.

In the method, the selection of a vehicle to take an image includes selecting an image sensor on the selected vehicle for taking the image.

In another aspect, an apparatus for generating images of roadway traffic conditions using crowd sourcing image gathering includes a computing device carried in a vehicle and having at least one processor executing stored program instructions to receive images from at least one image sensor carried on the vehicle, to couple vehicle coordinates and direction information with the recorded images; and to transmit the recorded images coupled with the vehicle operating coordinates and vehicle direction information to a traffic condition control.

The traffic condition control includes at least one processor executing program instructions to receive the images and vehicle operating coordinates and direction of travel from a vehicle, to store the recorded images, and the vehicle coordinates and direction of travel in a memory in response to a request from a vehicle for traffic conditions at a specific roadway location, to access the memory to retrieve the most recent traffic condition images for the specified roadway location; and to transmit the images to the vehicle which made the request for traffic conditions at the specified road location.

A display can be carried in the vehicle and coupled to the computing device in the vehicle for displaying the traffic condition images. The computing device can be responsive to a vehicle driver input specifying a roadway location for image download.

The computing device in the traffic condition control can override stored images for a specified roadway segment with traffic condition images of the same roadway segment of a more recent time and date.

The computing device in the control can store all of the images received from the vehicle for all roadway segments and vehicle coordinate data.

BRIEF DESCRIPTION OF THE DRAWING

The various features, advantages, and other uses of the present crowd sourcing exterior vehicle views of traffic conditions will become more apparent by referring to the following detailed description and drawing in which:

FIG. 1 is a pictorial representation of a crowd sourcing exterior vehicle view of traffic conditions according to the following description;

FIG. 2 is a pictorial representation of a vehicle carrying a computing device and one or more image sensors;

FIG. 3 is a block diagram of the computing device mounted in the vehicle shown in FIG. 2;

FIG. 4 is a pictorial representation of a vehicle navigation system display showing multiple road segments;

DETAILED DESCRIPTION

Figure 5:
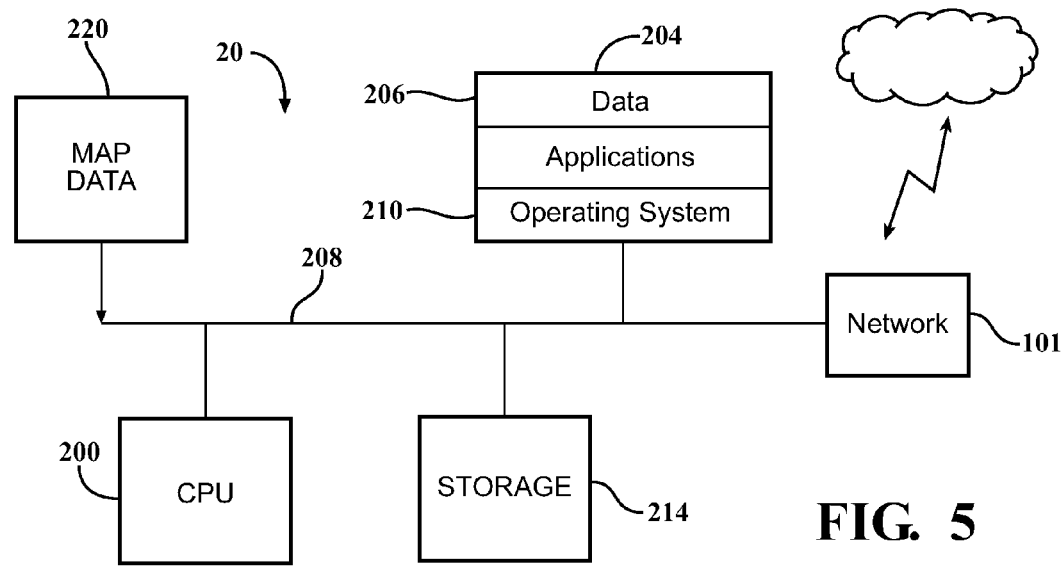
FIG. 5 is a block diagram of a central computing system interacting with the computer device in the vehicles shown in FIGS. 1 and 2.

The following description relates to crowd sourcing exterior vehicle views of road traffic conditions, "the system 10", which provides real time, up-to-date, street level traffic information for vehicle drivers either prior to the driver commencing a trip in his vehicle or while the driver is operating the vehicle.

The system 10 receives images recorded by an image sensor on a vehicle which are time and date stamped and coupled with vehicle coordinates and, optionally, vehicle operating conditions. The system 10 stores the recorded images in date and time order along with a coupled vehicle data. Upon receiving a request from a vehicle for traffic condition information at a particular road segment, the system 10 downloads the most recent images of the requested roadway segment through a communication network to the requesting vehicle.

The system 10 captures current traffic conditions from images sensors carried on the vehicle as the vehicle traverses a specific roadway. The images are time and date stamped, coupled with at least vehicle coordinate information and then transmitted remotely from the vehicle through a communication network to a crowd source traffic image control which stores the images. The control in turn retransmits the most current images of a specific roadway segment, location or site in response to a request from a vehicle.

The system 10 enables a driver to receive in response to a request from the driver, rather than having the driver wait for an intermittent radio broadcast of general traffic conditions without regard to specific locations that are of interest to the driver.

The system 10 is automatic, real time and unobtrusive to the vehicle driver. The system 10 is capable of providing real time images of actual traffic conditions on a route or road segments selected by a vehicle driver. Such routes or road segments can be the entire route the driver is or will be traveling in his vehicle, or selected intersections, road segments, road mileage markers, or other easily identifiable locations along a given roadway. This enables the driver can see in advance of reaching such a location on the road, the current traffic conditions at the location. This allows the driver a choice to either continue along his original route or to take an alternate route to avoid traffic congestion, a traffic accident that just occurred, temporary road construction, etc.

Referring now to the drawing, and to FIG. 1 in particular, there is depicted a pictorial representation of the system 10 using images, such as video or still images, of current traffic conditions at selected locations along a roadway which are collected by one or more vehicles traversing the roadway.

In FIG. 1, a vehicle 12 and a vehicle 14 are depicted. Additional vehicles 13, 15 and 17 are also depicted, as described hereafter. It will be understood that the number of vehicles forming part of the apparatus may vary from as few as one to many tens or hundreds of vehicles.

A computing device 100 on each vehicle 12 and 14 wirelessly communicates through a network 101, such as a cellular telephone network, satellite network, Wi-Fi network etc., to a central crowd sourcing traffic image control 20, ("the control" 20).

As shown in FIG. 2, the vehicle 12, as well as vehicle 14, includes at least one or more image sensors 64. The image sensors 64 can be any suitable type of image recording device having a field of view 66. For example, the image sensor 64 can be CCD cameras, infrared cameras, video cameras, etc., which have the ability to take repeated still or moving images and transmitting such images remotely from the vehicle 12.

While the individual image sensors 64 can have the ability to wirelessly transmit the recorded images remotely from the image sensor 64, the computing device 100 another dedicated circuit or device mounted in the vehicle 12 or 14 may have the capability to receive the recorded images from one or more image sensors 64 and separately transmitting such images remotely from the vehicle 12 to the control 20.

The image sensors 64 may be mounted at any one of a number of locations on the vehicle 12 suitable for capturing a wide field of view 66 image of a portion of a roadway on which the vehicle 12 is traversing. For example, one image sensor 64 may be mounted on the vehicle 12 facing in a forward direction to capture images of traffic conditions on the roadway ahead of the vehicle 12. The image sensor 64 may also be mounted in a rearward facing direction to capture traffic conditions on a roadway behind the vehicle 12. Side mounted image sensors 64 may also be provided on the vehicle 12 to capture traffic conditions to the sides of the vehicle.

Combinations of single or multiple image sensors 64 may be employed on the vehicle 12.

FIG. 3 is a block diagram of the computing device 100 for implementing the generation and/or display of road traffic conditions images in the vehicles 12 and 14. The computing device 100 can be any type of vehicle-installed, handheld, desktop, or other form of single computing device, or can be composed of multiple computing devices. The processing unit in the computing device 100 can be a conventional central processing unit (CPU) 102 or any other type of device, or multiple devices, capable of manipulating or processing information. The memory 104 in the computing device can be a random access memory device (RAM) or any other suitable type of storage device. The memory can include data 106 that is accessed by the CPU using a bus 108.

The memory 104 can also include an operating system 110 and installed applications 112, the installed applications 112 including programs that permit the CPU 102 to implement the traffic condition image generation and display as described below. The computing device 100 can also include secondary, additional, or external storage 114, for example, a memory card, flash drive, or any other form of computer readable medium. In one aspect, the installed applications 112 can be stored in whole or in part in the external storage 114 and loaded into the memory 104 as needed for processing.

The computing device 100 can also be coupled to one or more vehicle operating systems 116, 120 and 122, and the output 118 of the image sensor(s) 64. The computing device 100 can also be coupled to one or more vehicle interfaces 238, shown in FIG. 4 configured to receive input from the driver and provide feedback to the driver of the vehicle 12. The vehicle interfaces 230 can include, for example, an interactive display 240. The interactive display 240 can be configured to allow the driver to send commands to the computing device 100 intended to control the operation of the vehicle systems. Other vehicle interfaces, for example, a voice recognition system, could also be configured to receive driver commands regarding various vehicle systems.

The computing device 100 can be located within the vehicle 12 or 14 as shown in FIG. 2 or can be located remotely from the vehicle 12 or 14 in an alternate location (not shown). If the computing device 100 is remote from the vehicle, the vehicle 12 or 14 can include the capability of communicating with the computing device 100 through a network 101.

The network 101 can comprise any type of wireless communication network. For example, the network 101 can include any or all of a cellular telephone network, satellite communication network, as well as BlueTooth, etc.

Referring briefly to FIG. 5, there is depicted a block diagram of the control 20 which can serve as the crowd source traffic images control. The computing device 20 can be any type of single computing device or multiple interconnected computing devices. The processing unit in the computing device 200 can be one or more central processing units (CPU) 200 or any of device or devices capable of manipulating or processing information. A memory 204 in the computing device 20 can be a random access memory device or any other suitable type of storage device. The memory 204 can include data 206 which is accessed by the CPU 200 using a bus 208.

The memory 204 can also include an operating system 210 and installed applications 212, the installed applications 212 including programs that permit the CPU 202 to implement system 10 functions as described below. The computing device 200 can also include secondary, additional, or external storage 214, for example, a memory card, flash drive, or any other form of computer readable medium. In one aspect, the installed applications 212 can be stored in whole or in part in the external storage 214 and loaded into the memory 204 as needed for processing.

Map data 220 is also accessible to the CPU 200. The map data 220 can be stored in the memory 204 for access from a remote source, such as Google Maps® or any other map based data source.

The vehicle 12 and/or the vehicle 14 can include the interface or navigation unit 238 having the display 240 mounted at a suitable, easily accessible position for visibility to the vehicle driver. Typically, the navigation display 240 is mounted in the vehicle instrument panel so that the vehicle driver does not have to divert his eyes to any great extent from the oncoming road while viewing images on the navigation display 240.

As shown in the example of the navigation display example in FIG. 4, the navigation system 238 using onboard vehicle sensors, such as the GPS 120, map data 116, vehicle speed and acceleration/deceleration sensors 122, will display a portion of a map containing the current location of the vehicle 12 and the upcoming road image.

Although navigation units do not frequently show a vehicle, but rather only the route or roadway ahead of the current position of the vehicle, for example purposes to explain the operation of the present system 10, the display 240 depicts the current location of the vehicle 12 on a roadway 30 approaching an intersecting roadway 32. The vehicle 14 is depicted behind the vehicle 12 on the roadway 30. The vehicle 14 is traveling in the same direction on the roadway 30 as the vehicle 12. However, the vehicle 14 is depicted as approaching another intersection with a second roadway 34.

In operation, either automatically whenever the vehicle 12 or 14 is operated and moving in a forward direction on a roadway, or manually when activated by the vehicle driver, such as by a depression of an on/off switch on the navigation unit 238, images are recorded by the image sensors 64 on the vehicle 12. For some clarity in understanding the operation of the system 10, only a single image sensor 64 capturing images to the front of the vehicle 12 will be described. It will be understood that images from multiple vehicle image sensors 64 and the various field of views shown in FIG. 2, can also be employed.

When activated, the image sensor 64 captures images of the traffic conditions on the roadway 30 forward of the vehicle 12 as the vehicle 12 moves in one direction along the roadway 30. Such images are date and time stamped by the computing device 100. The computing device 100 can also couple other vehicle operating condition data, such the vehicle speed, whether the vehicle is accelerating or decelerating, GPS data from the GPS sensor 120 to the image data. The computing device 100 via the CPU 102 transmits such images and coupled data by a vehicle mounted transmitter or transceiver 130 remotely from the vehicle 12 through the network 101 to the control 20.

The control 20 stores the traffic conditions images and the vehicle operating data along with a geographic identification of the roadway 30 and the particular segment or location of the roadway 30 which has been captured in the images. Such geographic or coordinate information can be GPS coordinate information.

The vehicle 14 can also be recording traffic conditions using one or more image sensors 64 mounted on the vehicle 14 and having a field of view to the front of the vehicle 14. Such images are also time and date stamped, coupled with the operating conditions of the vehicle 14 and transmitted by the computing device 100 on the vehicle 14 through the network 101 to the control 20 where such images and vehicle 14 operating condition data are stored.

Either automatically throughout the movement of the vehicle 12 and/or 14, or periodically, such as every 15 seconds, 30 seconds, 1 minute, etc., depending on vehicle speed, traffic conditions, or the driver's preference as a selectable input, or manually whenever the driver supplies a selection input via the navigation unit 238, for example, by tapping a selection button on the navigation unit 238, or tapping a location on the display 240 when the display 240 is provided as a touchscreen display, or by verbal instructions through a voice recognition unit mounted in the vehicle 12 or 14, the CPU 200 in the control 20 can access the memory 204 and transmit through the network 101 to the particular traffic conditions requesting vehicle 12 or 14 the most recent images of the road segment, road coordinates or a location on the roadway 30, for example, selected by the driver of the vehicle 12 or 14. Such images can be displayed on the navigation display 240 to provide the vehicle driver with a recent or real-time image of the traffic conditions on the roadway 30.

For example, the vehicle 12, progressing in one direction along the roadway 30 as shown in the example depicted in FIG. 4, can capture images of the road conditions at the intersection 33 of the roadway 30 and the roadway 32. The intersection 33 is in the field of view of the forward facing sensor 64, described by example as mounted on the vehicle 12, and can cover both directions on the roadway or the intersection of the roadways 30 and 32. While such information is of no practical value to the driver of the vehicle 12, the up transmission and then down transmission of such images through the control 20 and then from the control 20 through the network 101 to the vehicle 14 can provide the driver of the vehicle 14 with an advance picture, either still or moving, of the traffic conditions ahead of the current position of the vehicle 14. This would enable the driver of the vehicle 14, for example, to anticipate the upcoming traffic conditions, such as by slowing down in the case of traffic congestion, an accident, etc., or turn onto the roadway 34 and take an alternate route to his destination.

The vehicle 14 can also receive an image of the traffic conditions at an intersection 35 of roadways 30 and 34 taken, in the present example shown in FIG. 4, from the rear image sensor of the vehicle 12 which has just passed through the intersection 35 to give the most current image of the traffic conditions at the intersection 35.

Specific road segments, such as distance locations also are selectable by a vehicle drivers between two locations on a roadway, intersections, locations of road narrowing, highway exit and/or entrance ramps, or any other location on a roadway which has an influence on traffic conditions can be preset as a road image point where the image sensor 64 records an image. Such locations can also be selected by a vehicle driver. In the case where the image sensor 64 records video images, the recorded images can be between any two locations on the roadway segment or over a predetermined distance on the roadway.

The image selection distance ahead, behind or to the sides of the vehicles 12 and 14 which are displayed in the images downloaded from the control 20 can be automatically preset at a predetermined distance, depending upon the roadway arrangement. In urban settings with frequent intersections and short length blocks between cross roads, the image selection distance can be selected as one block, such as 100 meters, for example. On rural roads, with fewer intersections, the image selection distance can be a much greater distance such as a 500 meters, 1000 meters, 1500 meters, etc. The image selection distance on highways can also be set depending upon the frequency of exits and entrances to the highway, and/or the current vehicle speed or the average vehicle speed on that segment of the roadway.

The preset for variably selectable image selection distance can also take into account the current speed of the vehicle 12 or 14 from which the request originated. If, for example, the image selection distance is preset at 100 meters, the vehicle driver may prefer to receive images of the upcoming road segments 100 meters in advance of the current position of the vehicle 12 or 14 earlier in time when the vehicle is traveling at 50 miles per hour then if it were traveling 30 miles per hour. At higher speeds, the preset image selection distance could be automatically lengthened by the computing device 100 to account for the greater distance covered by the vehicle in a particular time segment.

As navigation systems 238 used in vehicles can have the ability to, upon driver input, expand or narrow the map data displayed at one time on the navigation unit display 240, a vehicle driver, for example, could expand the range of this map data displayed on the display 240 to show several miles of roadway along his intended route. The driver, by manual depression of an input button or switch, voice recognition, touch screen, etc., could then select a particular location along the roadway in advance of the preset image selection distance and have the traffic conditions at that selected roadway location transmitted to his vehicle and displayed on the navigation unit display 240.

The system 10 can also be configured to provide fast forward display of the most recent stored traffic conditions at each recorded segment or location along a roadway or path to be traveled by a particular vehicle from the start of travel to the end destination. For example, a vehicle driver, before even starting to move the vehicle, can select his start location and his end destination, and then select traffic conditions, to see a speeded up display of the most recent traffic conditions at each recorded location along the intended travel route.

Since the number of vehicles 12 and 14 which are provided with the capability of recording and transmitting traffic conditions data to the control 20 is unknown at any given time on any given roadway or segment of a roadway, the control 20 will record the most recent downloaded image data pertaining to a particular road segment or coordinate location and then upload such information to a particular vehicle upon a request from the driver of the vehicle along with time and date stamp information which can be displayed on the display 240 to alert the driver that the image being displayed were taken at a particular time and day. Thus, the system 10 can merely collect data as one or more vehicles coupled to the control 20 record traffic conditions as the vehicles 12 and 14 traverse the same or different roadways 30, 32, 34, etc. For example, the traffic conditions recorded by the vehicle 12 as the vehicle 12 approaches the crossroad 32 will be uploaded by the computing device 100 from the vehicle 12 to the control 20. Similar images taken a short time later, either a few seconds or a few minutes, by the vehicle 14 will also be uploaded through the network 101 to the control 20. The control 20 can have the capability of overwriting the images of the intersection 33 of the roadways 30 and 32 taken by the vehicle 12 with the same images of the traffic conditions at the intersection 33 of the roadways 30 and 32 taken by the vehicle 14.

The control 20 can also have the capability of storing all of the images from all of the vehicles at all locations and road segments throughout a 24 hour day for each day of the week. This would enable a vehicle driver, for example, to plan his route from a start location to an end destination depending upon the particular time of day and day of week that he intends to travel. Since traffic conditions while frequently having periodic rush hours of heavy traffic congestion, with stop and go traffic, interspersed with light traffic conditions, can still vary depending upon the day of the week, a driver can quickly review the stored images from the control 20 of a particular road coordinate location or segment for a given day or for multiple days of the week at one or more times during each day to aid the driver in selecting the time and/or day of his travel as well as his route.

It will also be understood that the above described system 10 may also be used only by the driver of vehicle 12. While the image sensor or sensors 64 in the vehicle 12 are recording traffic conditions along the roadway 30 as the vehicle 12 traverses the roadway 30 and transmitting such images to the control 20, the driver of the vehicle 12 can simultaneously request traffic condition information at the image selection distance ahead of the vehicle 12. Such traffic condition information was previously received by the control 20 from another vehicle, not shown, at an earlier point in time when the previous vehicle traversed the same roadway 30. As described above, the control 20 can use the time and date stamp information stored with images from the previous vehicle and supply the time and date stamp information to the driver of the image requesting vehicle to make the driver aware of the time and date when the images were taken.

Figure 7:
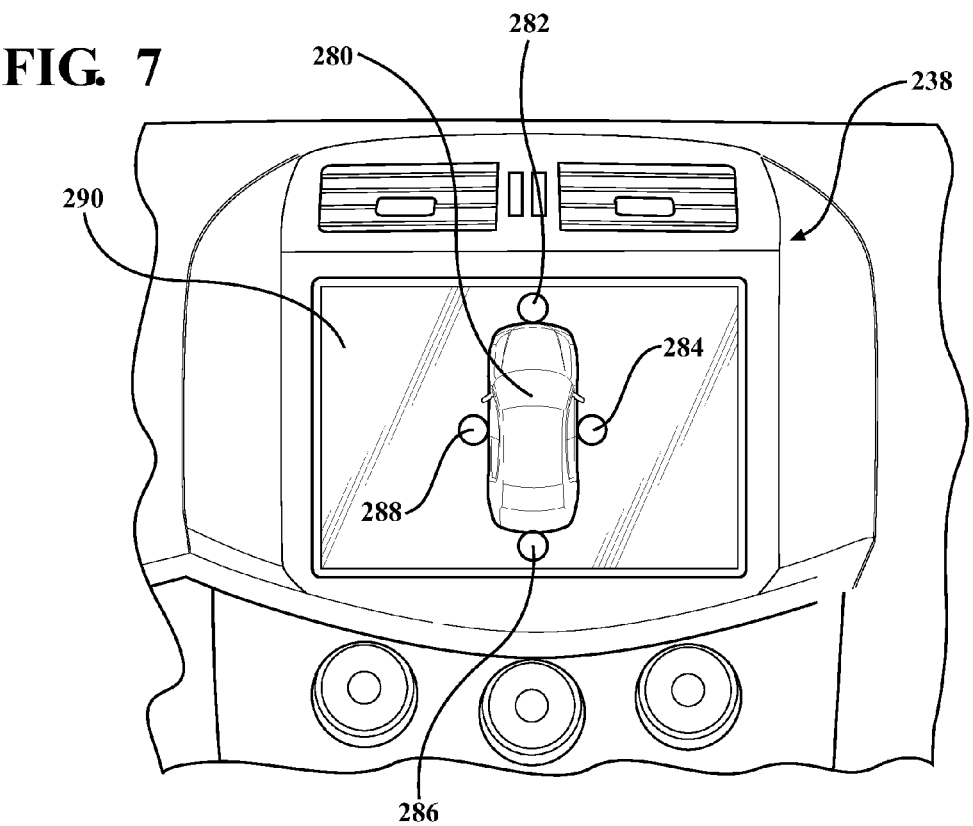
FIG. 7 is a pictorial representation of a vehicle navigation system display showing an opt-in selected vehicle icon.
Figure 6:
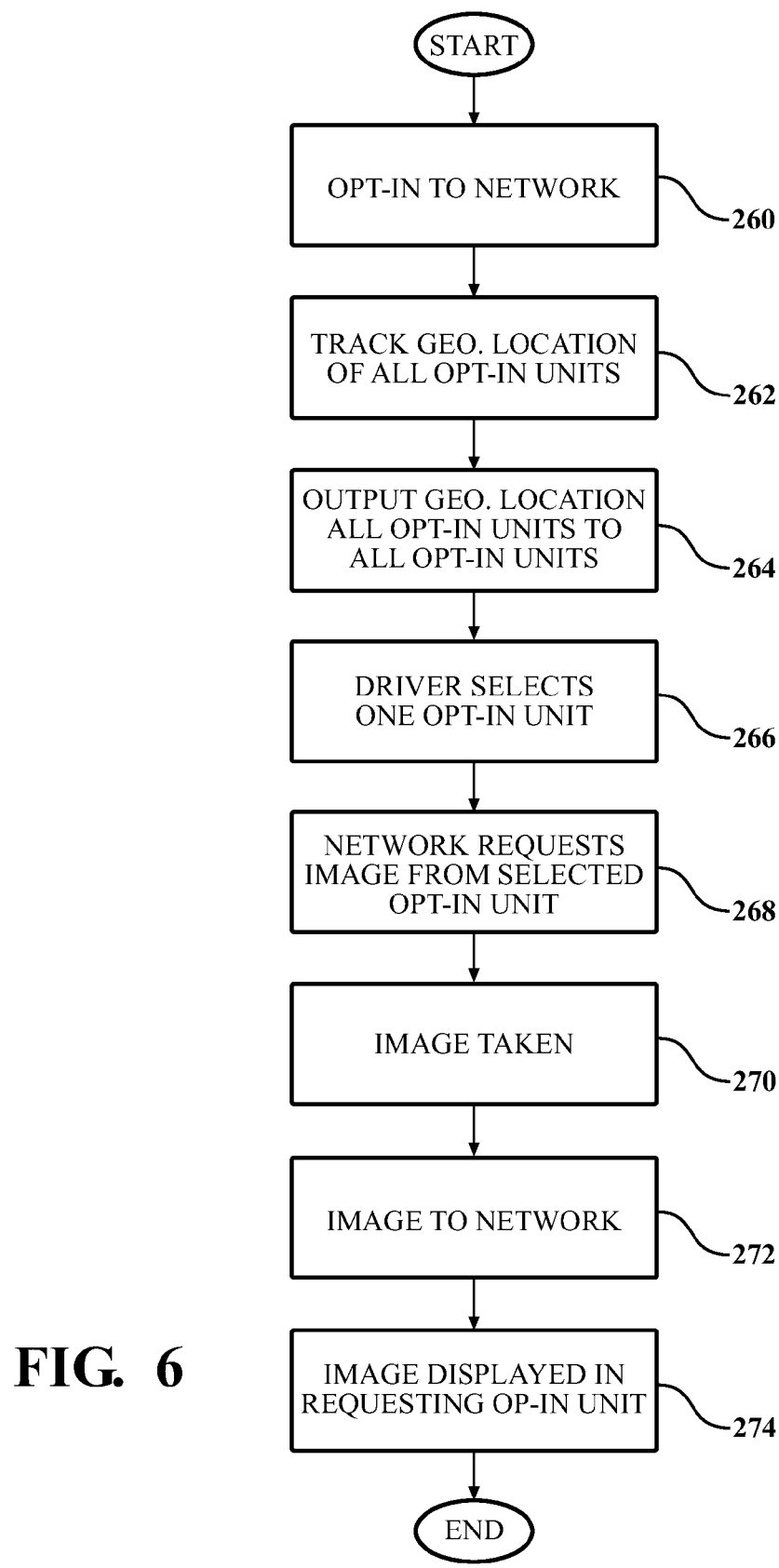
FIG. 6 is a flow chart of another aspect of a traffic condition generation and reporting apparatus and method.

In another aspect of the traffic condition reporting apparatus and method, an opt-in instantaneous traffic condition image location selection feature is shown in FIGS. 4, 6 and 7.

Any of the vehicles 12, 13, 14, 15 and 17 shown in FIG. 4 which are currently in operation and which have the network communication capability described above, can opt-in to the instantaneous traffic condition image selection and generation feature. The opt-in feature can be automatic, that is, a particular vehicle 12, 13, 14, etc., will automatically opt-in in step 260, FIG. 6, to the instantaneous image selection feature every time the vehicle begins and during operation. Alternately, the opt-in feature can be activated in step 260 of FIG. 6, by an input from the driver of any vehicle 12, 13, 14, etc., through an input switch, touching an input selection area of a touchscreen navigation display 240, voice command, etc.

Once any of the vehicles 12, 13, 14, etc., have opted-in to the system 10 in step 260, the control 20 will continually or periodically track the geographic location of each vehicle 12, 13, 14, etc., which has opted-in to the system 10 in step 262. In addition to the geographic location of each opted-in vehicle 12, 13, 14, etc., the control 20 stores a vehicle I.D. and the number and location of the image sensors on each particular vehicle 12, 13, 14, etc.

In step 264, the control 20 outputs the geographic location of all vehicles 12, 13, 14, etc., which are currently opted-in to the network 101 and displays all of such vehicles as icons in the navigation screens 240 in each opted-in vehicle 12, 13, etc. This allows the drivers of all vehicles 12, 13, etc. which are opted-in to the network 101 to instantaneously view the location of other currently opted-in vehicles 12, 13, etc. If the driver of any opted-in vehicle 12, 13, etc. such as vehicle 14 wishes to see an image of current traffic conditions at any road location, such as at the intersection 33 of roads 30 and 32, shown in FIG. 4, the driver can select one of the icons on the navigation screen 240 in step 266 which is approaching or has just passed the selected road location, such as intersection 33.

For example, the driver of vehicle 14, when he or she wishes to receive an image of the current traffic conditions at road intersection 33, can select, by voice command, tapping on the icon depicting any vehicle on the navigation screen 240, any one of the vehicles 12, 13, 15 and 17.

This vehicle selection command is transmitted from the vehicle computing device 100 through the network 101 to the control 20 which identifies the requesting and the selected vehicle and generates a return command through the network 101 to the computing device 100 in the selected vehicle in step 268. This command is processed by the computing device 100 in the selected vehicle and the desired image is taken by one image sensor in the selected vehicle in step 270. As described above, the computing device 100 in the selected vehicle transmits the image through the network 101 to the control 20 in step 272. The control 20, in step 274, then transmits the selected image to the network 101 to the requesting vehicle 14 where the image is instantaneously displayed on the navigation screen 240 of the vehicle 14.

While most vehicles will include a forward facing sensor, as described above, additional image sensors may also be provided on each vehicle. However, each vehicle may have only one, only two, only three, or only four or more sensors. To accommodate this variation in image sensors on any opted-in vehicle, the system is capable, when a driver of one vehicle selects one opt-in unit in step 266, to display an icon 280 of the vehicle selected by the requesting driver on the navigation screen 240 of the requesting vehicle. This image 280, which may be enlarged, as shown in FIG. 7, can include one or more indicators 282, 284, 286 and 288 depicting the location of the image sensors on the selected vehicle 280. The driver of the requesting vehicle need only touch or issue a voice command selecting one of the image sensors 282, 284, 286 and 288 on the selected image sensor within the field of view of the selected vehicle to obtain an instantaneous image of the desired road location.

For example, the driver of vehicle 14, when requesting an instantaneous image of the current traffic conditions at road intersection 33, can select any of the vehicles 12, 13, 15 and 17. When the icon 280 representation of the selected vehicle is displayed on the requesting vehicle navigation screen 240, one or more of the image sensor symbols 282, 284, 286 and 288 will be displayed. This allows the requesting driver to select the rear image sensor 286 of vehicles 13 or 17 which have just passed through the intersection 33. Alternately, the requesting driver can select the forward facing sensor 282 of vehicle 12 or vehicle 15 which are approaching the road intersection 33.

Either of the side image sensors 284 or 286 of a vehicle may also be requested if the vehicle is in close proximity to or in the road intersection 33.

It will be understood that the above instantaneous selection, generation and display of traffic road conditions for vehicle which have opted-in to the network 101 can be used in addition to the selection and transmission of the most current past taken image of a road location selected by a requesting driver, as described above. The instantaneous image taken and transmitted to the requesting driver in accordance with the sequence depicted in FIGS. 7 and 8 can also be stored by the control 20 as the most recent image of that specific road location. In this instance, the control 20 can add an appropriate date and time stamp for the instantaneous image when it is stored in the memory storage 214.

What is claimed is:

1. A method of reporting traffic condition images between vehicles, the method comprising:
    providing computing devices in a plurality of vehicles, each computing device coupled to a plurality of image sensors configured for recording images on a roadway traversed by the respective vehicle;
    at each of the plurality of vehicles, recording images generated by the plurality of image sensors in the respective computing device;
    coupling vehicle operating condition data with the images;
    transmitting the images and the vehicle operating condition data from the respective computing devices through a network for storage in a crowd sourcing traffic condition control, wherein each image is stored in conjunction with time and date stamp information and coordinates of a roadway segment where the image was taken;
    upon request for traffic condition images, transmitting and displaying, to a requesting vehicle, an icon of a selected vehicle actively coupled to the crowd sourcing traffic condition control, the icon including a plurality of indicators, each depicting a location of an image sensor;
    receiving, by the crowd sourcing traffic condition control, an inquiry from the requesting vehicle for a traffic condition image from a selected image sensor of the selected vehicle, and transmitting commands to the selected vehicle for generating an image from the selected sensor;
    receiving, by the crowd sourcing traffic condition control, an image from the selected sensor of the selected vehicle; and
    transmitting, by the crowd sourcing traffic condition control, the traffic condition image to the requesting vehicle for display in the requesting vehicle.

2. The method of claim 1 wherein the crowd sourcing traffic condition control:
    stores all of the images from the plurality of vehicles; and
    in response to a request for traffic condition images containing at least one specified road coordinate location, in conjunction with time and date stamp information and direction, transmits the traffic condition images for the date, time and direction to the requesting vehicle.

3. The method of claim 1 further comprising:
    tracking, by the crowd sourcing traffic condition control, a geographic location of each vehicle with network transmission capabilities.

4. The method of claim 3 wherein any of the plurality of vehicles can opt-in to participate with the crowd sourcing traffic condition control.

5. A system for generating images of roadway traffic conditions using crowd sourcing image gathering, the system comprising:
    a network;
    a plurality of computing devices carried in a respective plurality of vehicles and having at least one processor executing stored program instructions to:
        receive images from at least one image sensor of a plurality of image sensors carried on each respective vehicle;
        record each image with a time and date stamp;
        couple vehicle operating coordinates and vehicle direction information with each of the recorded images; and
        transmit the recorded images coupled with the vehicle operating coordinates and vehicle direction information through the network;
    a display carried in each vehicle and coupled to the computing device in the vehicle for displaying traffic condition images;
    a crowd sourcing traffic condition control including at least one processor executing program instructions to:
    receive the recorded images coupled with the vehicle operating coordinates and vehicle direction information from a vehicle over the network;
    store the recorded images in a memory;
    in response to a request from an image requesting vehicle for traffic conditions for a specific roadway segment, transmitting and displaying, to the requesting vehicle, an icon of a selected vehicle actively coupled to the crowd sourcing traffic condition control, the icon including a plurality of indicators, each depicting a location of an image sensor; and
    transmit, over the network, the images from a selected image sensor to the image requesting vehicle which made the request for traffic conditions.

6. The system of claim 5 wherein any of a plurality of vehicles can opt-in to participate with the system.

7. The system of claim 6 wherein the crowd sourcing traffic condition control transmits signals for display on each navigation screen of any vehicle opted-in to the system.

* * * * *